May 11, 1965

R. D. LIVINGSTON 3,182,925

BOBBIN HANDLING MECHANISM FOR WINDERS

Filed May 22, 1963

INVENTOR.
Richard D. Livingston
BY
ATTORNEYS

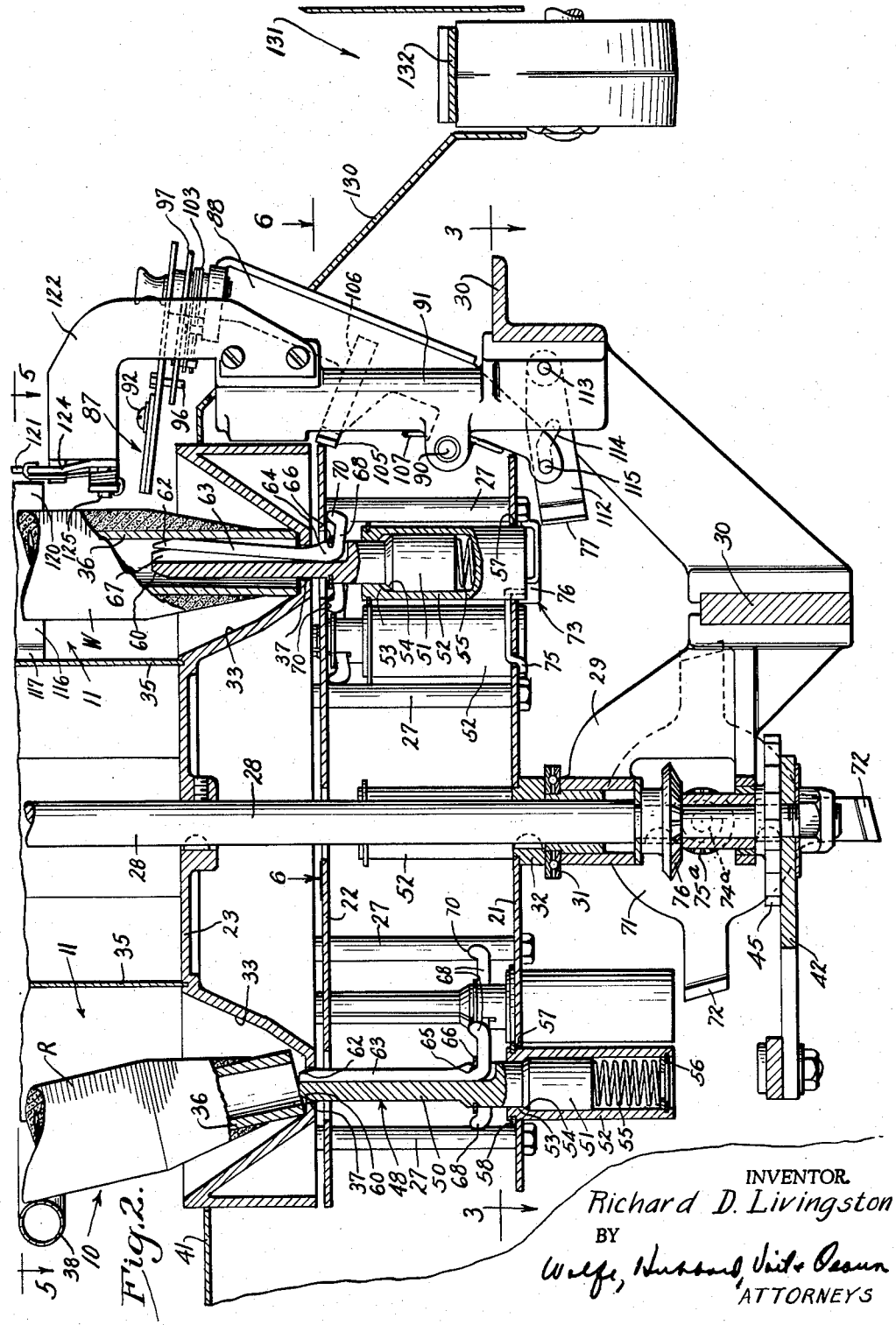

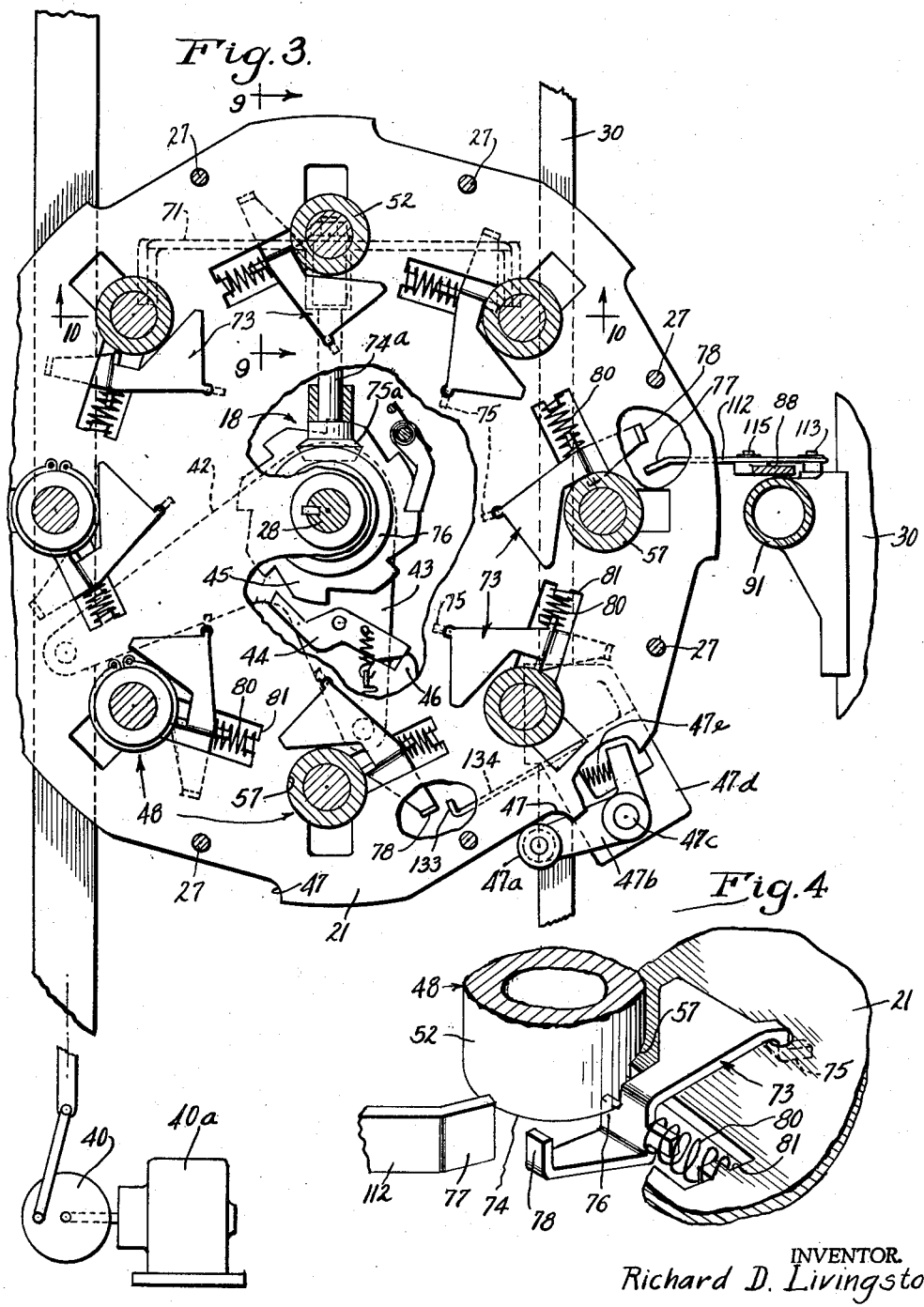

INVENTOR.
Richard D. Livingston
BY
ATTORNEY

May 11, 1965  R. D. LIVINGSTON  3,182,925
BOBBIN HANDLING MECHANISM FOR WINDERS
Filed May 22, 1963  10 Sheets-Sheet 5

INVENTOR.
Richard D. Livingston
BY
ATTORNEYS

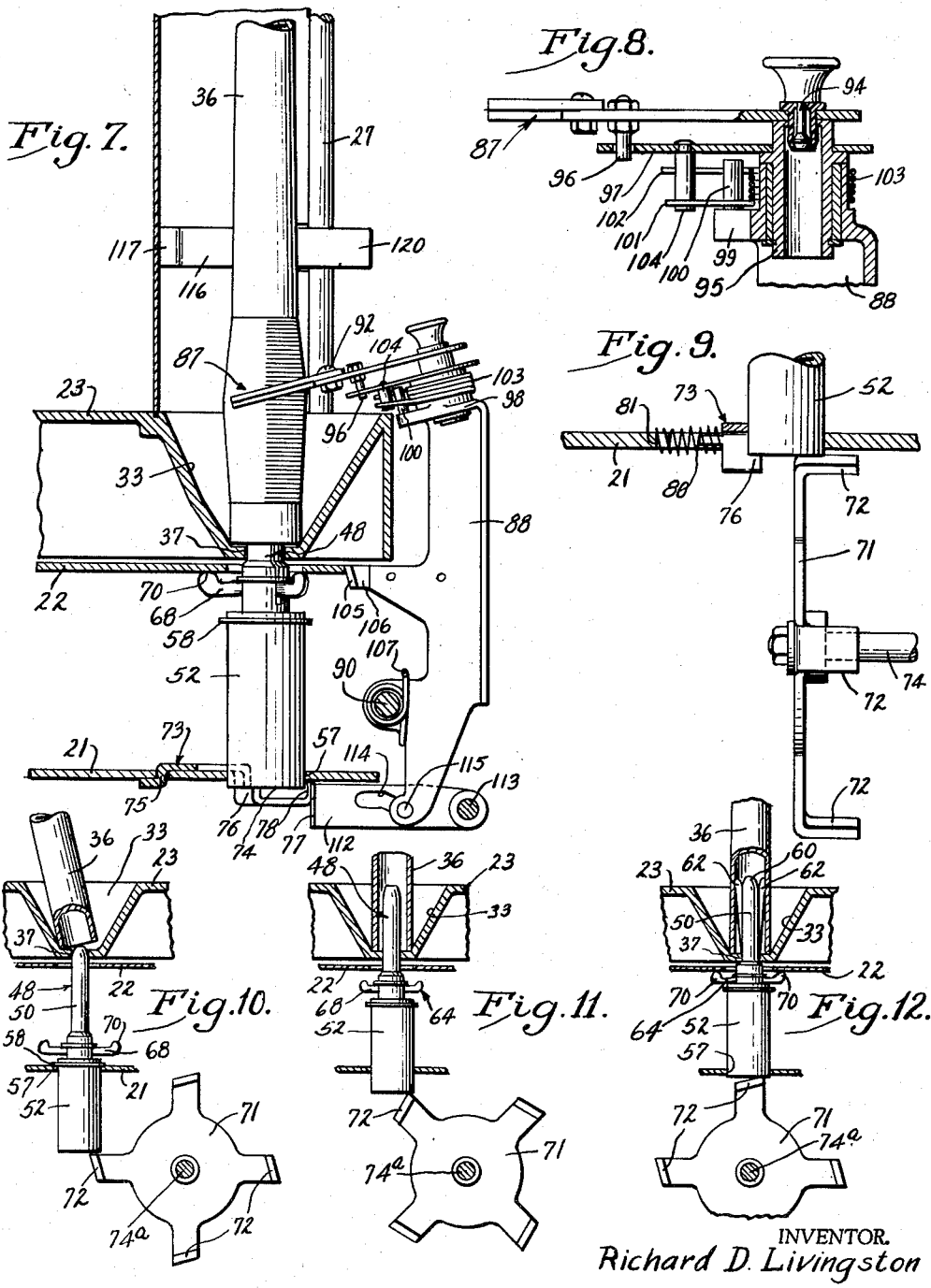

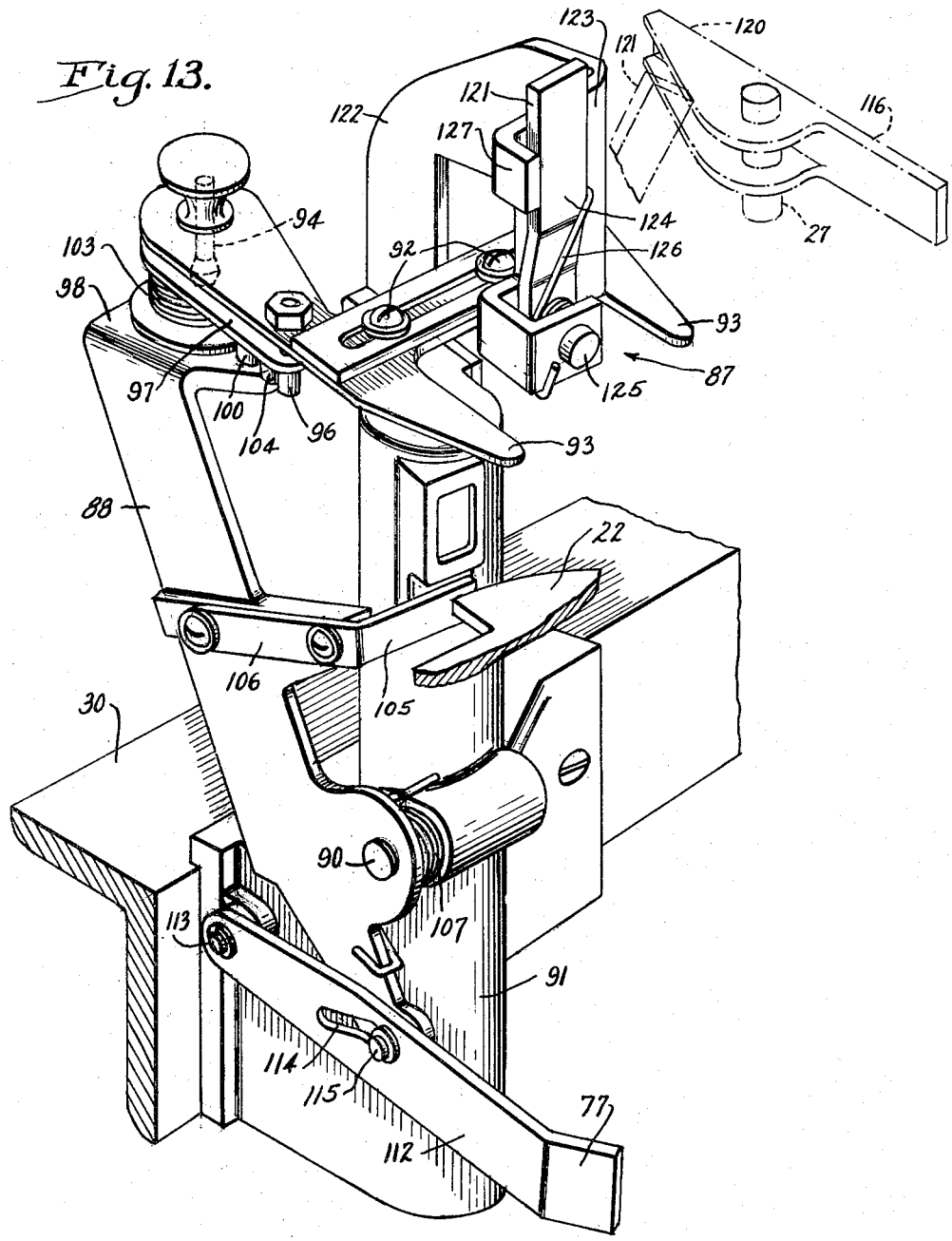

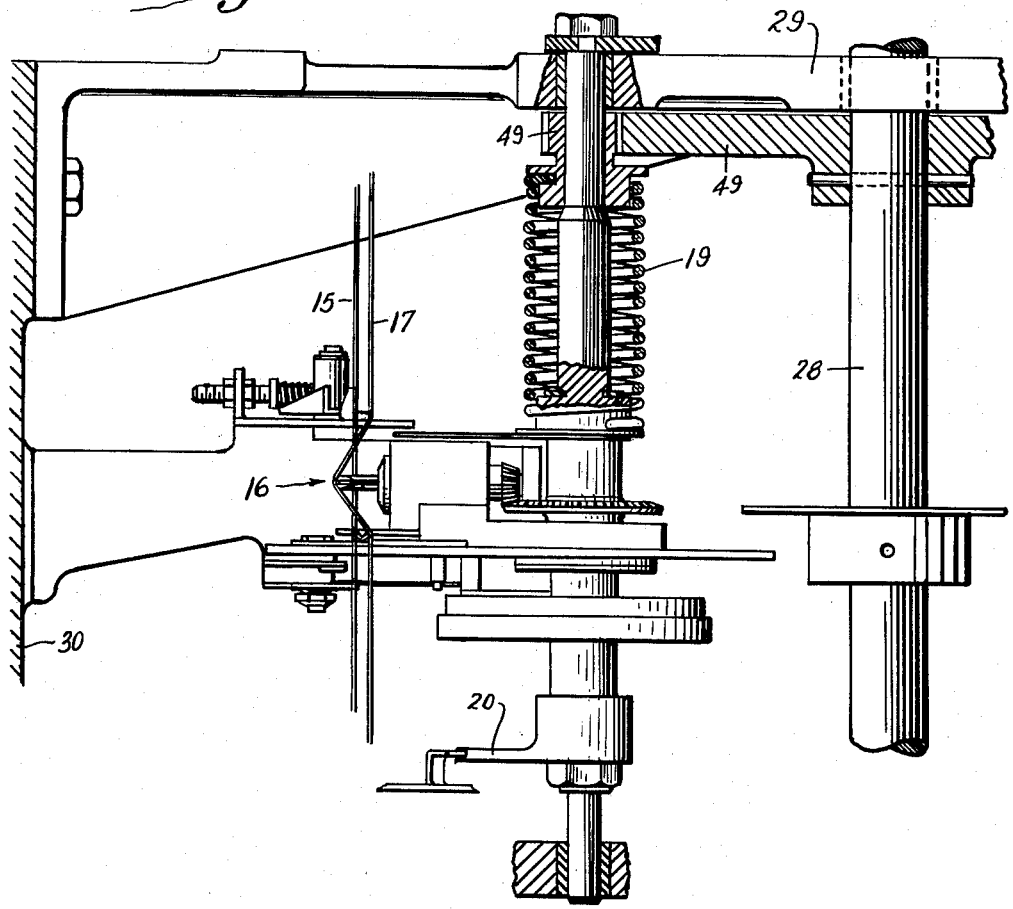

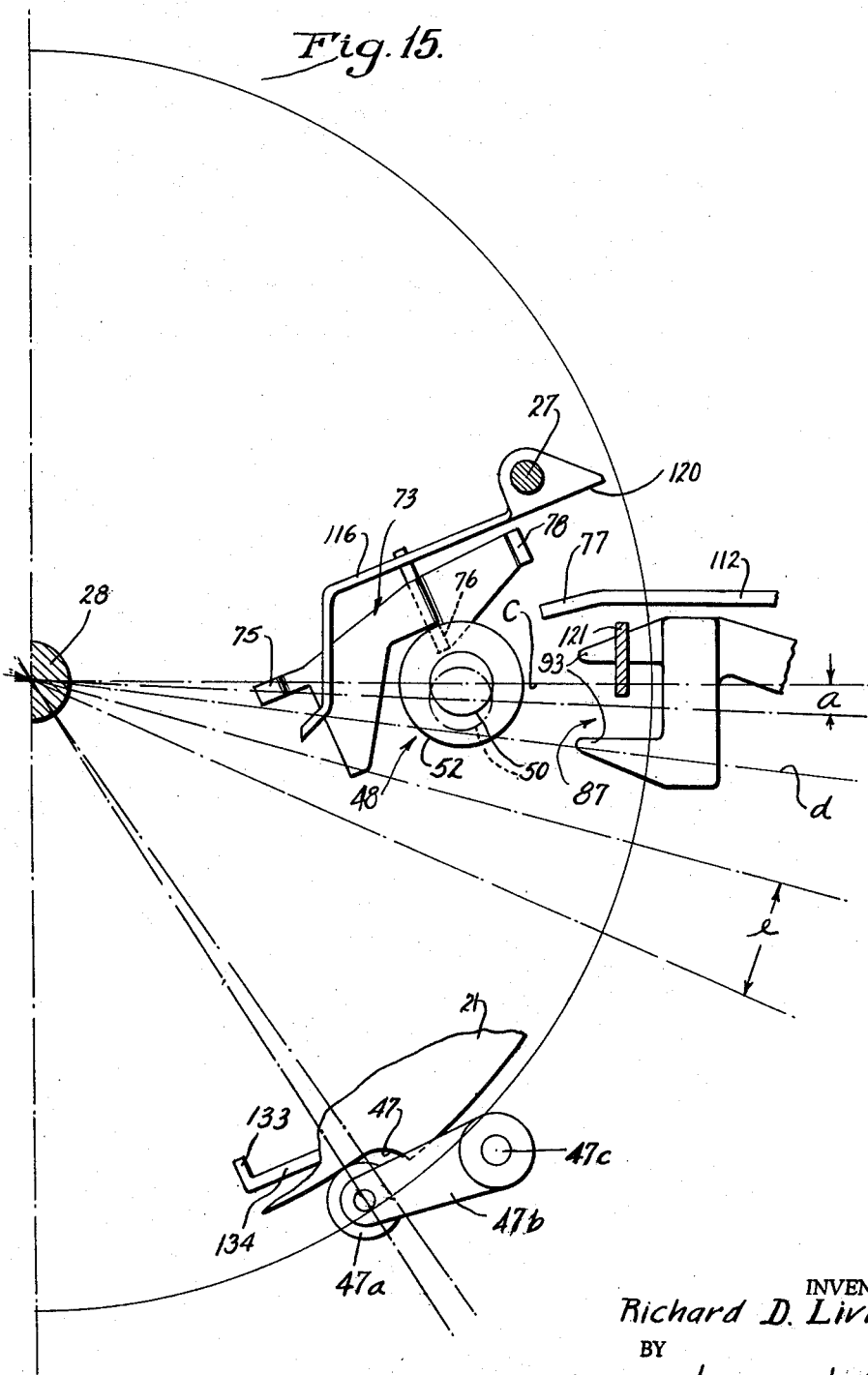

May 11, 1965 R. D. LIVINGSTON 3,182,925
BOBBIN HANDLING MECHANISM FOR WINDERS
Filed May 22, 1963 10 Sheets-Sheet 10
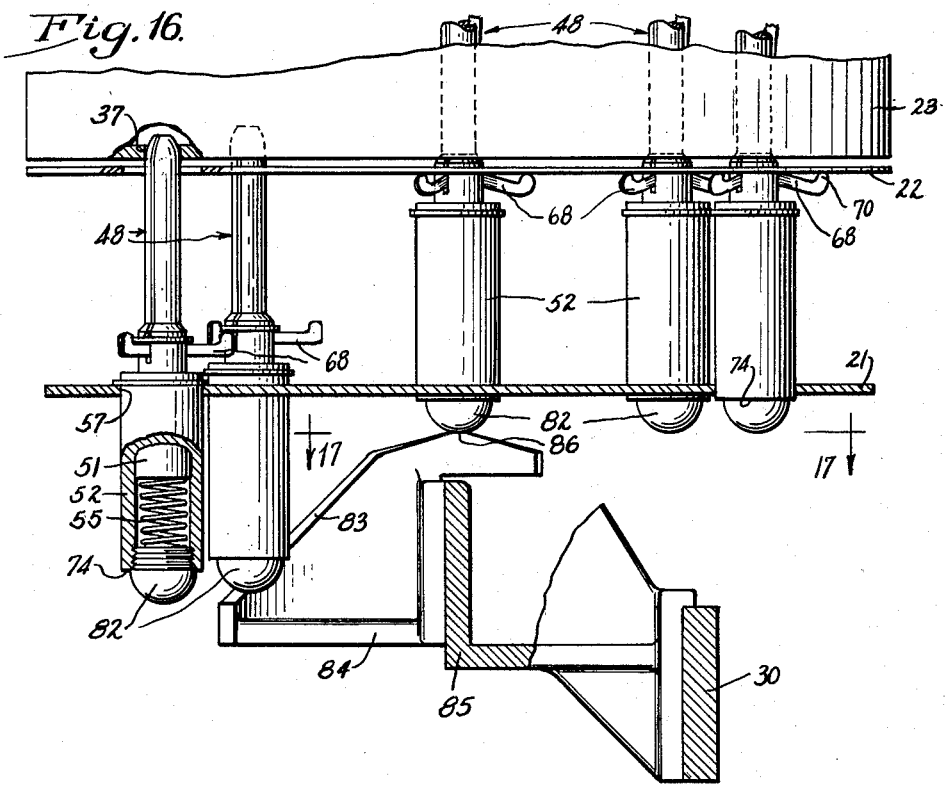
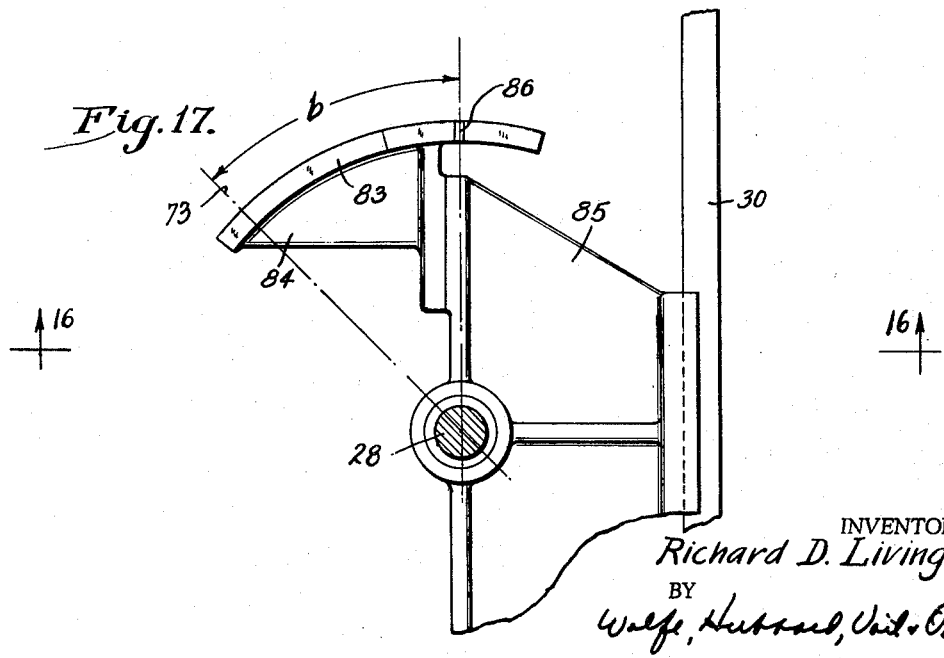
INVENTOR.
Richard D. Livingston
BY
ATTORNEYS

United States Patent Office 3,182,925
Patented May 11, 1965

3,182,925
BOBBIN HANDLING MECHANISM
FOR WINDERS
Richard D. Livingston, Rockford, Ill., assignor to Barber-Colman Company, Rockford, Ill., a corporation of Illinois
Filed May 22, 1963, Ser. No. 282,425
27 Claims. (Cl. 242—130)

This invention relates to a mechanism for skewering bobbins and transferring the same one by one into and out of a winding position at which the thread is drawn off until it breaks or becomes exhausted. The invention has more particular reference to high speed winders of the type disclosed in Patent No. 3,017,129 in which a plurality of bobbins are disposed in upwardly and outwardly opening pockets angularly spaced around a magazine which is indexed step by step around an upright axis and in each step transfers an empty bobbin out of said winding position and the adjacent or first reserve bobbin into such position. In a loading area on the opposite side of the magazine, full bobbins are deposited manually into the pockets and free lengths of their threads are hung up on the top of the magazine.

The primary object of the present invention is to provide in a winder of the above general character for the disposal of the empty or so-called strip bobbins and skewering of the new bobbins entirely automatically thus relieving the operator of all handling operations except depositing reserve bobbins into empty pockets and hanging up the threads thereof.

Another object is to utilize the indexing movements of the bobbin magazine to perform numerous new functions such as skewering the bobbins approaching the winding position, sizing the bobbins leaving such position to separate the empty from the partially filled bobbins to be rerun through the winder, release of the skewers and doffing the empty bobbins, and subsequently unskewering the remaining partially filled bobbins.

A further object is to skewer and release each bobbin in response to endwise raising and lowering of a skewer through the bottom of the bobbin pocket.

The invention also resides in the novel manner of adapting the skewers for firm gripping of bobbin cores of widely varying sizes.

Another object is to provide a novel and simple device for mechanically measuring the sizes of the partially filled bobbins and utilizing the same to control the selective doffing of the undersize bobbins.

A further object is to shape the bottom of the bobbin pockets so that loose bobbins are inclined away from the vertical but nevertheless adapted to receive the skewer when the latter is projected upwardly.

Still another object is to utilize the skewer in a novel manner to effect doffing of the empty bobbins.

The invention further resides in the simple and novel construction of the skewer actuator and the doffer and its actuator.

Other objects and advantages of the invention will become apparent from the following detailed description taken in connection with the accompanying drawings, in which FIGURE 1 is a fragmentary perspective view of part of a winder having a bobbin magazine embodying the novel features of the invention.

FIG. 2 is a fragmentary section taken along the line 2—2 of FIG. 1.

FIG. 3 is a fragmentray section taken along the line 3—3 of FIG. 2.

FIG. 4 is a fragmentary perspective view of the skewer latch and associated parts.

FIG. 7 is a portion of FIG. 2 showing a different position of the parts.

FIG. 8 is a fragmentary section taken along the line 8—8 of FIG. 5.

FIG. 9 is a fragmentary section taken along the line 9—9 of FIG. 3.

FIGS. 10, 11 and 12 are schematic sections taken approximately along the line 10—10 of FIG. 3 showing different positions of the skewer parts.

FIG. 13 is a fragmentary perspective view of the bobbin size measuring device and associated parts.

FIG. 14 is a fragmentary section taken along the line 14—14 of FIG. 1.

FIG. 15 is a schematic view and time chart.

FIG. 16 is a view similar to FIG. 2 showing a modified construction of the skewer actuating mechanism, the section being taken along the line 16—16 of FIG. 17.

FIG. 17 is a fragmentary section taken along the line 17—17 of FIG. 16.

Figure 1:
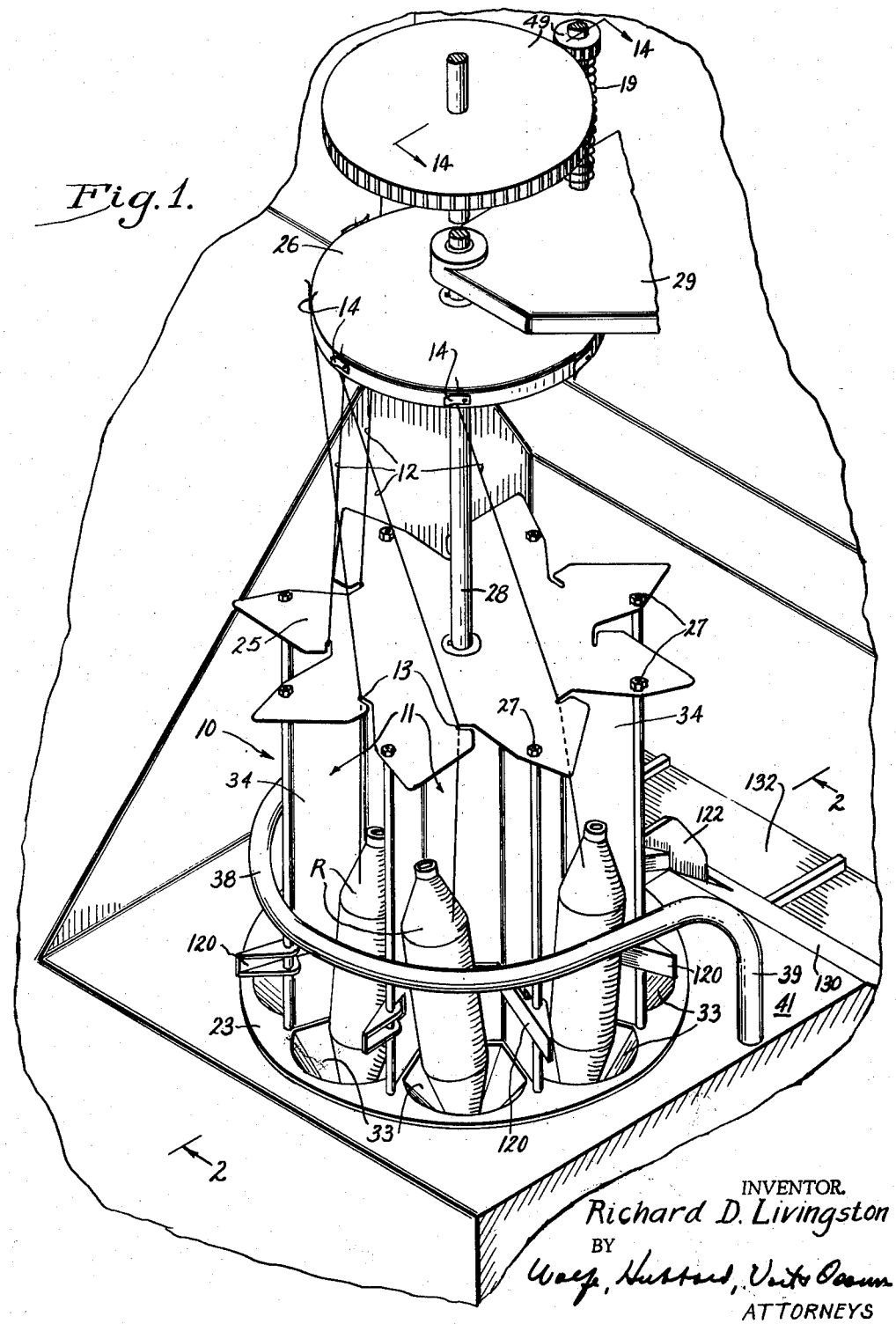

While the invention is adapted for use in various types of winders, it is shown for purposes of illustration in a winder of the type disclosed in the aforesaid patent. It is to be understood that I do not intend by such disclosure to limit the invention in any way but aim to cover all modifications and alternative constructions falling within the spirit and scope of the invention as expressed in the appended claims.

In the form shown, the bobbins are carried successively to a winding position on a magazine indicated generally at 10 (FIG. 1) and comprising an annular series of outwardly opening pockets 11, eight in the present instance, into which full or partially filled reserve bobbins R are dropped endwise into the pockets in a loading zone at the front of the winder and advanced one by one to a winding position at the rear as the magazine is indexed in fixed steps about an upright axis. Unwound lengths 12 of the reserve threads are hung up in guides 13 and clamps 14 while the thread 15 (FIG. 14) of the active bobbin W (FIGS. 2 and 5) in winding position c (FIG. 15) is drawn upwardly and wound onto the package being formed.

When running out or breaking of the running thread 15 is detected, a knotter 16 (FIG. 14) is fired and acts instantaneously to tie the trailing end of this thread to the first reserve thread 17 and resume the winding. Such interruption of the running thread also activates a mechanism 18 (FIG. 3) for advancing the magazine one step, forty-five degrees in this instance, to perform numerous functions including bringing the first reserve thread into proper association with the knotter as shown in FIG. 14 and rewinding of the knotter actuator spring 19 and setting a latch 20 for holding the knotter actuator in firing position, all as fully disclosed in the aforesaid patent.

The bobbin magazine 10 comprises three disk-like plates 21, 22 and 24 rigidly joined together in a desired vertically spaced relation by angularly spaced tie bolts 27 and suitable spacers fixed to a vertical shaft 28 which is journaled in spaced brackets 29 on the winder frame 30 and supported by a thrust bearing 31 (FIG. 2) below a collar 32 onto which the lowermost plate 21 is pressed. Conical depressions 33 formed in and uniformly spaced around this plate define the bottoms of the bobbin pockets 11 each of which is defined by an upright channel opening outwardly and clamped between the plates 23 and 25 by the tie-bolts 27. Radially disposed side walls 34 (FIG. 5) and a connecting inner wall 35 are so spaced from the axis of the pocket bottom 33 that while a bobbin standing on end in the bottom will be inclined away from the vertical as shown at the left in FIG. 2, the bore in the core 36 of such bobbin will be alined approximately with a hole 37 in the bottom of the pocket. An arcuate bar 38 supported by legs 39 upstanding from a base plate 41 extends around the magazine over the loading zone and defines a narrow outer wall which limits the outward tipping of the bobbins as shown at the left in FIG. 2.

To load a new bobbin into an empty pocket, the operator finds and unwinds a length of the thread, drops the bobbin endwise over the bar 38 and into the pocket and leads the unwound length of thread upwardly through the proper guide notch 13 and then forwardly and upward into the corresponding spring clamp 14 on a disk 26 secured to the shaft 28. A partially filled bobbin, which is returned by the magazine to the loading zone, is withdrawn manually from the pocket, and after finding the loose end of its thread, is returned to the pocket and its thread hung up in the corresponding guide and clamp.

Indexing of the magazine may be accomplished by any suitable mechanism, the one shown herein being fully disclosed in the aforesaid patent. Referring to FIGS. 2 and 3, it includes a crank 40 continuously rotated by a motor 40$^a$ and coupled through a link to one arm of a bell-crank 42 journaled on the magazine shaft 28 and having another arm 43 on which is pivoted a pawl 44 cooperating with a ratchet wheel 45 fast on the shaft. A latch 46 pivoted on the arm 43 normally holds the pawl in retracted position as the arm is rocked back and forth by the crank. When the running thread is interrupted, the latch is tripped as described in said patent on the next retracting stroke of the pawl thus releasing the latter which on the reverse stroke advances the magazine one step or forty-five degrees in this instance.

A short initial part indicated at $a$ (FIG. 15) of the indexing motion occurs with a quick snap action produced as explained in the aforesaid patent by energy derived from the spring 19 (FIGS. 1 and 14) in the execution of the knotter cycle following detection of a thread break. The extent of such advance is limited by engagement of an outwardly projecting abutment 47 (FIG. 3) on the magazine plate 21 with a roller 47$^a$ carried by the free end of an arm 47$^b$ of a bell-crank fulcrumed at 47$^c$ on a bracket 47$^d$ on the winder frame. A spring 47$^e$ acts in compression against another arm of the bell-crank to normally hold the roller in the path of the next abutment 47 while allowing the roller to yield and the abutment to pass in the ensuing advance of the magazine by the pawl 44. The indexing step is completed with the next abutment spaced behind the roller as shown in FIG. 3. The indexing of the shaft 28 is transmitted through gears 49 to rewind the knotter spring 19 which becomes held by resetting of the latch 20.

While each bobbin is disposed in the winding position, it is held securely in upright position by a skewer 48 of novel construction adapted in accordance with one aspect of the invention to be raised from a lower retracted and collapsed position (FIG. 10), telescoped within a substantial length of the core of the bobbin standing on end in a magazine pocket (FIG. 11), expanded within the bobbin core (FIG. 12) and later released from the bobbin, all of these functions being performed by the indexing motion of the magazine. Herein, each skewer comprises a rigid plunger 50 having an enlarged lower end 51 slidable in a tube 52 having an inturned flange 53 at its upper end in which the plunger is guided, the flange forming a stop engageable with a shoulder 54 to limit the upward movement of the plunger under the action of a compression spring 55 as shown at the left in FIG. 2. The spring is disposed within the tube and abuts a shoulder 56 at the lower end thereof. Each tube extends through a hole 57 in the bottom plate 21 and is guided by the latter for vertical axial movement upwardly from a normal retracted position in which an outturned shoulder 58 on the upper end of the tube rests on top of the plate and the upper coned end 60 of the skewer plunger 50 projects through a hole in the plate 22 and is disposed loosely in a smaller hole 37 in the flat central part of the bottom 33 of the bobbin pocket. The end 60 is thus adapted, when the plunger is raised, to enter the tubular core 36 of a bobbin standing on end in the bobbin pocket and tilted away from the vertical and against one of the upright walls of the pocket.

After entry of substantially the full length of the plunger into a bobbin core, the skewer 48 is expanded into firm gripping engagement with the core wall of bobbins of different sizes that may be loaded into the magazine pockets. Such engagement in the present instance is by angularly spaced fingers 62 at the upper end of the plunger 50 movable radially from a normally collapsed position (FIG. 10 and at the left of FIG. 2) to an expanded position (FIG. 12 and at the right in FIG. 2). Herein, the fingers 62, three in this instance, constitute the upper ends of elongated and upright arms 63 of right angular bell-cranks 64 fulcrumed at 65 on a ring 66 encircling the plunger 50 below the disk 22 in all positions of the skewer. In the collapsed condition of the skewer, the arms 63 are disposed in outwardly opening slots 67 formed in and extending longitudinally of the upper end portion of the plunger.

Short arms 68 of the bell-cranks project outwardly and horizontally from the fulcrums with their ends 70 positioned to come into abutment with the bottom of the plate 22 after the major length of the plunger 50 has entered the bobbin core as shown in FIG. 11. Then, as the raising of the skewer tube is continued to its uppermost position shown in FIG. 12 and at the right in FIG. 2, the bell-cranks are rocked to swing the fingers 62 out of the slots 67 and against the wall of the bobbin core thus cooperating with the conical pocket bottom 33 to hold the bobbin securely in vertical position.

To adapt the skewers for use with bobbins having core holes of different sizes, provision is made for raising each skewer tube 52 through a range sufficient to accommodate bobbins of the largest size. In the form shown in FIGS. 1 to 12, such raising is effected by a star-wheel 71 (FIGS. 2, 3, 9-12) disposed in a vertical plane and having angularly spaced arms with laterally bent ends 72 adapted for engagement with the lower end of each tube 52 as the skewer moves out of the loading zone $f$ (FIG. 5) and into the zone $b$ on its way to the winding position $c$. The wheel is fast on a horizontal shaft 74$^a$ journaled on the machine frame and carrying a bevel pinion 75$^a$ (FIGS. 2 and 3) meshing with a larger gear 76 fast on the magazine shaft 28. The gear ratio is such as to turn the star-wheel during each indexing motion of the magazine clockwise a quarter revolution from the rest position shown in FIG. 10. In this position, the end 72 of one arm is disposed beneath one skewer tube 52 then in the retracted or lowered position and remains in engagement during the ensuing indexing step in which the skewer and the bobbin pocket are advanced horizontally forty-five degrees.

In this movement of the star-wheel, the tube 52 and the plunger 50 are raised from the retracted position (FIG. 10) thus first inserting the collapsed skewer into the core of the reserve bobbin while raising the arms 68. When the skewer is fully inserted, the arms will come into abutment with and be stopped by the bottom of the plate 22 after which the bell-cranks 64 will be rocked in the continued raising of the tube 52 until the ends 62 of the fingers 63 come against the internal wall of the bobbin core (FIGS. 2 and 12). Thereafter, the raising of the tube continues for the remainder of the fixed range produced by the star-wheel, this being permitted by compression of the spring 55. The indexing step of the magazine is thus completed with the skewer parts in the position shown in FIGS. 9 and 12. It will thus be apparent that the last part of the range of the upward movement of the tube 52 is converted into outward movement of the fingers 62 for gripping the bobbin core regardless of its size and thereafter cooperating with the conical pocket bottom to hold it firmly in vertical position while the bobbin is disposed in the winding position.

To maintain the skewer expanded as the bobbin approaches and while it is disposed in the winding position, the tube 52, after being raised, is latched in its uppermost position and so held while disposed in and passing through such position and after disengagement by the star-wheel 71. For this purpose, there is a latch 73 for each skewer fulcrumed on the bottom plate 21 of the magazine and swingable horizontally in beneath a shoulder defined by the lower end 74 and each tube 52 as the latter reaches its uppermost position. Herein, the latch comprises a sheet metal stamping (FIG. 4) having one end 75 bent into Z-shape and, when inserted through a hole in the plate 21 forming a fulcrum adapting the latch for horizontal swinging to carry a lug 76 in and out of a position beneath the lower end of the tube 52 as shown in FIG. 4.

To utilize the indexing of the magazine through a simple stop 77 to release each latch 73 in the proper position of the skewer in its circular path of travel with the magazine as more fully described later, the latch extends radially and outwardly from the pivot 75 at its inner end and across the trailing side of the skewer axis. The latch is thus disposed so that its outer free end 78 moves in the direction of the magazine indexing to engage the latch beneath the skewer tube and in the reverse direction to trip the latch and release the skewer. A compression spring 80 is disposed on the side of the latch opposite the lug 76 and acts between the intermediate part of the latch and an abutment 81 formed on the magazine plate 21 which carries all of the latches as shown in FIG. 3, each latch being biased clockwise by the spring. Thus, whenever the tube 52 of any skewer is raised above the plane of the lug 76, the latch swings in beneath the lower end of the tube as shown in FIG. 4 and at the right in FIG. 2 to maintain the skewer raised and expanded in the continued turning of the bobbin magazine after the skewer tube has passed out of engagement with the star-wheel 71.

A modified and preferred form of means for raising the skewers 48 is shown in FIGS. 16 and 17. In this form, plugs 82 having rounded lower surfaces are secured in the lower ends of the tubes 52 to provide abutments for the springs 55 and form followers adapted, in the portion *b* (FIGS. 5 and 17) of the travel of the skewer to engage and ride up an inclined surface 83 on a cam plate 84. The latter is concentric with the shaft 28 at the same radius as the followers 82 and is fixed to a bracket 85 on the frame 30. The skewer latch becomes engaged as the follower reaches the upper end of the cam rise 83 so that the latch remains engaged and its bobbin skewered after the follower passes the high point 86 of the cam and the bobbin thereon is carried in subsequent indexing cycles to and through the winding position, the bobbin coming to rest in the winding position *c* (FIGS. 5 and 15) at the end of the second indexing step following disengagement of the follower from the cam 83. This same timing of the raising, latching and holding of the skewers is produced in the turning of the star-wheel 71 in the form described above.

Figure 5:
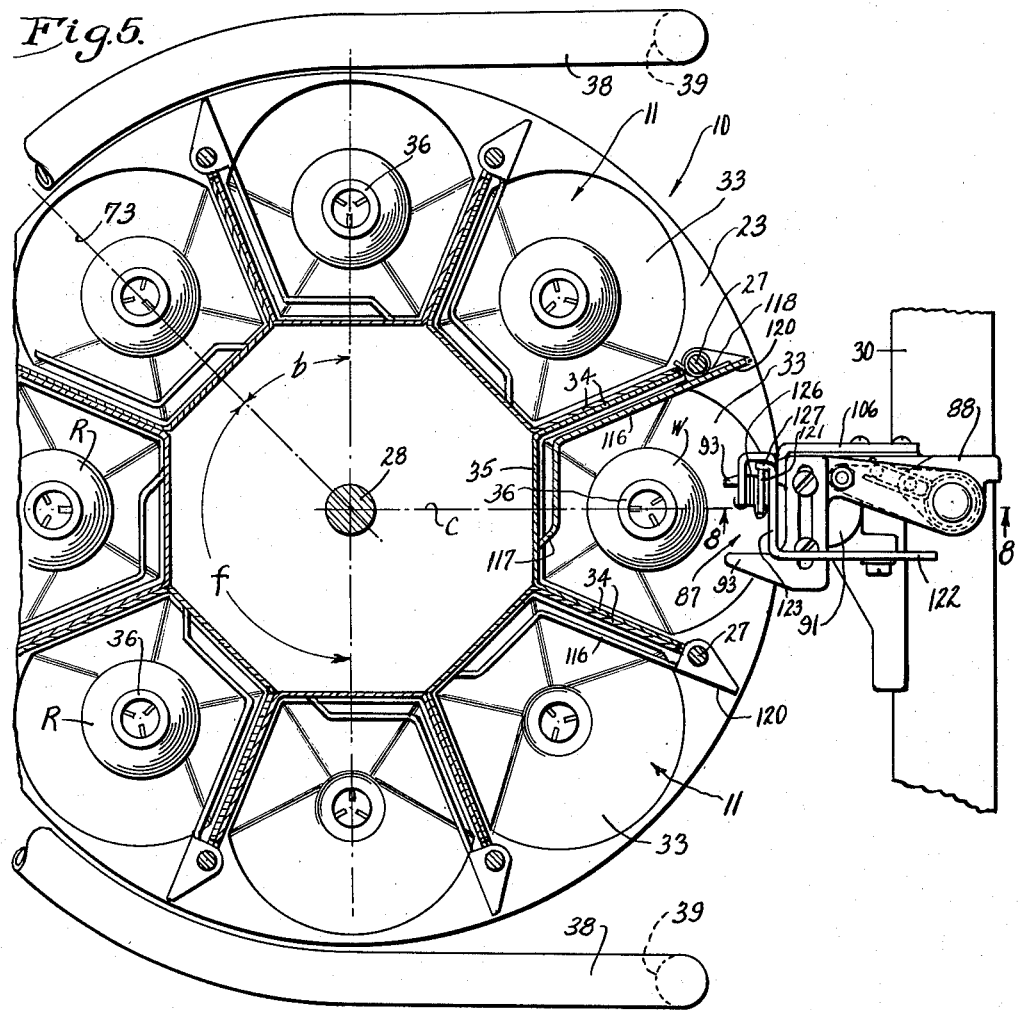
FIG. 5 is a fragmentary section taken along the line 5—5 of FIG. 2.

In another of its aspects, the invention contemplates sensing the size of each bobbin to determine the extent of exhaustion of the thread thereof after unwinding of the thread has been interrupted and doffing out of the magazine each bobbin which is exhausted or carries such a small amount of thread as to make its reuse in the winder uneconomical. In the present instance, size sensing is effected mechanically while the bobbin is still in the winding position. For this purpose, a feeler in the form of a fork 87 (FIGS. 2, 5, 5a, 7 and 13) is mounted opposite each bobbin transferred out of the winding position and adapted for movement radially and inwardly relative to the bobbin magazine from a normal inactive position (FIG. 5) into straddling engagement with the bobbin as shown in FIGS. 5a and 7. Herein, the fork is on the upper end of an upstanding lever 88 fulcrumed intermediate its ends on a pin 90 projecting generally tangentially of the magazine below the bottoms of the bobbin pockets. The pin is on an upright post 91 secured at its lower end to a cross-bar of the machine frame 30 and disposed as shown in FIGS. 2 and 5 adjacent the magazine and opposite the bobbin in the winding position. The fork is thus disposed approximately horizontal and adapted for feeling engagement with the bobbin in the winding position in a plane just above the lower coned portion of the thread mass when the bobbin is full. Through a pin and slot connection controlled by screws 92, the spacing of the fork arms 93 may be adjusted to accommodate bobbins having cores of different diameters plus a remaining amount of thread which is insufficient to render the bobbin reusable in the winder.

Herein an expansible pin 94 (FIGS. 8 and 13) depending from the outer end of the fork 87 is adapted for snap interengagement with the upper end of a pivot tube 95 to permit convenient removal of the feeler fork and replacement by a feeler with its arms 93 preset for sensing a different size of bobbin. In this way, the winder may be changed easily for handling threads of different bobbin cores.

As an incident to pressing the pin 94 into the tube, a depending pin 96 intermediate the ends of the fork enters a hole in the free end of an arm 97 fast on the tube 95 which is journaled in and supported by a lug 98 projecting laterally from the upper end of the lever 88 and carries an upstanding pin 100 engageable on opposite sides with projecting end portions 101 and 102 of a torsion spring 103 coiled around the upper part of the lug 98. Spaced from the pin 100 and engaged on opposite sides by the spring ends is a pin 104 rigid with and depending from the arm 97. With this arrangement, the spring normally holds the fork in the radial position shown in FIG. 5 when the lever is retracted as shown at the right in FIG. 2. However, when the fork is advanced into engagement with a bobbin being indexed out of the winding position, it is free to move with such bobbin and swing counter-clockwise (FIG. 5a) as permitted by yielding of the spring arm 101.

Figure 6:
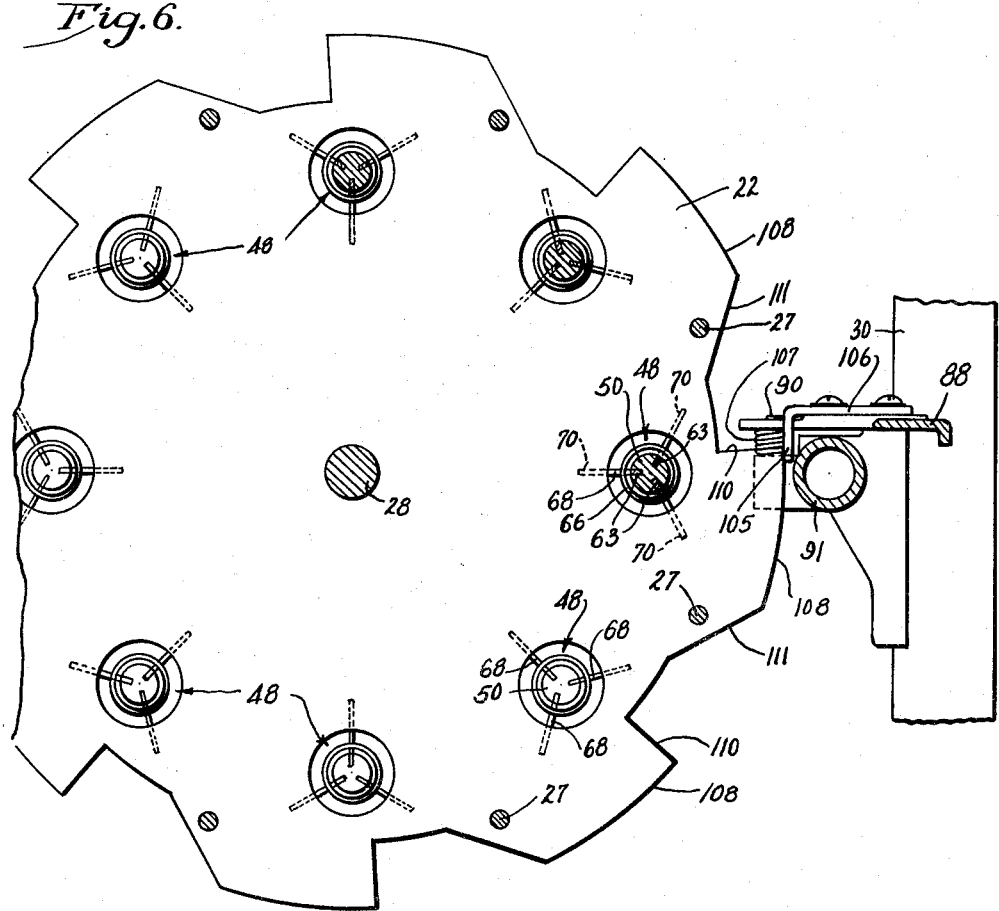
FIG. 6 is a fragmentary section taken along the line 6—6 of FIG. 2.

Movement of the feeler between retracted and feeling positions (FIGS. 2 and 7) is controlled by groups of cam surfaces formed on the outer edge of the disk 22 and angularly spaced to correspond to spacing of the magazine pockets 11. These surfaces coact with a follower comprising the end 105 of a lug 106 (FIGS. 2, 6, 7 and 13) projecting laterally from the lever 88 and held continuously in engagement with the cam disk by a torsion spring 107 wound around the lever pivot 90 and urging the lever counter-clockwise (FIG. 2) and the feeler inwardly. The follower is so positioned that in each rest position of the magazine, the end 105 of the follower bears against a raised surface 108 on the cam as shown in FIG. 6 adjacent the trailing end of such surface which terminates in an abrupt fall 110. The spacing of the latter from the follower end is less than the cam movement resulting from the quick advance *a* of the magazine which, as explained above, occurs instantaneously following detection of a thread break and before starting the slower part of the indexing motion by the pawl 44. At the end of such quick advance, the associated bobbin is still held in vertical position by its skewer and will, as shown in phantom in FIG. 15, be disposed in a radial plane disposed midway between the fork arms 93.

As the cam fall 110 moves past the follower end 105, the fork is swung inwardly into feeling engagement with the bobbin with the arms 93 straddling the core 36 if empty or the mass of thread remaining thereon. The extent of such straddling and inward movement is determined by the amount of thread remaining on the bobbin.

In each case however, the ends of the fork arms straddle at least a portion of the bobbin periphery so that in the ensuing slower indexing of the magazine by the pawl 44, the feeler 87 is swung counter-clockwise by the advancing bobbin as permitted by yielding of the spring 103.

About midway in the indexing motion, the follower 105 is engaged by a rise 111 on the cam thus initiating reverse rocking of the lever 88 and retraction of the feeler which is completed when a dwell 108 on the cam is presented to the follower. After partial retraction coupled with the forward swinging with the bobbin, the leading arm 93 of the feeler is passed by the bobbin just beyond the position shown in FIG. 5a. The feeler is thus free to swing back to normal radial position (FIG. 5) under the action of its spring 103. If, due to the maximum allowable amount of thread remaining on the bobbin, such reverse swinging is delayed long enough for the tie-bolt 27 to interfere, the feeler will again yield due to its spring 103 and allow the tie rod to pass before swinging back to its normal inactive position.

The extent of inward movement of the feeler is an indication of the amount of thread remaining on the bobbin leaving the winding position. Bobbins which are empty or carry such a small amount of thread as to render reuse uneconomical permit inward movement of the feeler to or beyond a predetermined position and such movement is utitlized in accordance with another aspect of the invention to initiate doffing of such bobbin and ejection of the same out of the magazine. This involves freeing of the bobbin from its skewer 48 followed by tipping of the bobbin out of its pocket and off from the magazine.

Release of the skewer is effected by tripping the skewer latch 73 at d early in the indexing motion while the sizing feeler 87 is in engagement with the bobbin to be doffed. Herein this is accomplished by the stop 77 (FIGS. 2 to 5a and 15) above referred to which is adapted to be raised and lowered into and out of the path which the outer end 78 of the skewer latch traverses during the magazine indexing. This stop comprises the inner end of a horizontal and radially extending arm 112 fulcrumed at its opposite and outer end on a pin 113 on the lower end of the post 91 below the disk 21 supporting the skewer latches. A cam slot 114 (FIGS. 2 and 7) intermediate the ends of the arm coacts with a follower pin 115 projecting laterally from the lower end of the lever 88. The slot is shaped to hold the stop 77 lowered below the level of the latch ends 78 when the feeler 87 is retracted and in the inner end of the slot as shown in FIG. 2. As the feeler swings inwardly and senses the presence of an empty bobbin or one small enough to require doffing, the pin 115 is moved to the outer end of the cam slot as shown in FIG. 7 thus rocking the lever to carry the stop 77 upwardly into the path of the oncoming latch end 78. Then the outer latch end will come into abutment with the stop and be blocked so that, as the indexing continues, the latch will be swung horizontally and counter-clockwise about its fulcrum 75 and thus moved out from under the lower end 74 of the skewer tube 52. The latter and the skewer thereon thus drop out of the bobbin core to the position shown at the left in FIG. 2 thereby freeing the bobbin. But if the bobbin felt of by the fork 87 carries enough thread to be reusable in the winder, the stop 77 is not, in the inward movement of the feeler, raised far enough to block the latch end 78. In such a case, the latch remains engaged thus continuing to hold the bobbin firmly in upright position and the latter moves to the next rest position of the magazine.

Doffing of the bobbin thus freed is preferably effected in the final part e (FIG. 15) of the indexing motion. This is accomplished herein by the horizontal counter-clockwise or outward swinging of an arm 116 of a bell-crank (FIGS. 1, 5 and 5b) which is fulcrumed on the tie-bolt 27 adjacent the outer edge of the trailing wall 34 of the bobbin pocket. In its normal inactive position, this arm extends inwardly along the trailing wall, then laterally across the inner wall 35 with its free end 117 normally held against this wall by a torsion spring 118 coiled around the tie-bolt. To utilize the indexing motion of the magazine to effect such doffing, a second arm 120 of the bell-crank projects radially and outwardly from the fulcrum 27 of the bell-crank in a normal position to engage and be blocked by a stop in the form of an upstanding lug 121 (FIGS. 2, 5 and 13) mounted on a bracket 122 which is rigid with the upper end of the post 91 and has a flange 123 disposed above the path of movement of the sizing feeler 87. The stop lug is the upper end of a bar 124 fulcrumed at its lower end on a pin 125 and urged by a torsion spring 126 encircling such pin and urging the stop reversely of the direction of indexing of the bobbin magazine and thus swinging and holding the stop against a lug 127 on the bracket as shown in full in FIG. 13 but is nevertheless free to yield in the indexing direction.

Figure 5B:
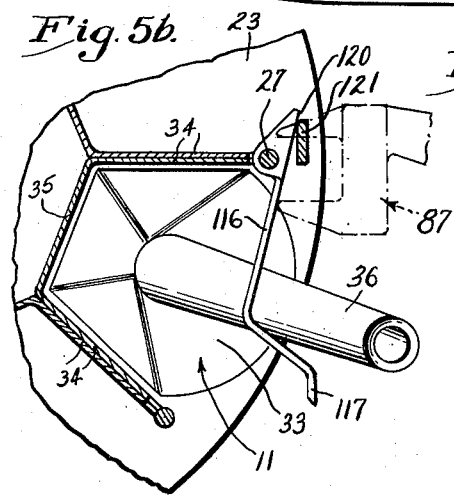
FIGS. 5a and 5b show parts of FIG. 5 with the parts in different positions.
Figure 5A:
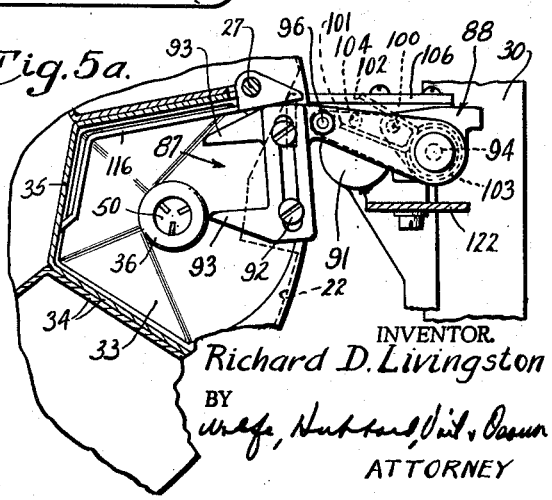

With the bell-crank arm 116 vertically spaced as shown in FIG. 1 about midway between the ends of a free bobbin standing on end in the pocket, it will be apparent that as the indexing of the bobbin magazine continues after the arm 120 encounters the stop 121, the arm 116 will be swung outwardly and radially across the pocket as shown in FIG. 5b thus tipping the bobbin outwardly and over the outer edge of the pocket bottom. When the free end of the arm passes out of engagement with the stop 121, the doffing bell-crank is swung back to normal position by its spring 118. The bobbin thus ejected from the magazine falls onto a downwardly inclined chute 130 (FIG. 2) and slides down into a trough 131 and is carried away by a conveyor 132 in the bottom of the trough.

But if the skewer of the pocket moving past the lug 121 is raised and the partially filled bobbin therein is thus still held firmly in upright position, the arm 120 will be held against further swinging after the other bell-crank arm 116 has been swung against the rigidly held bobbin. Then, as the indexing continues, the force of the spring 126 will be overcome and the stop 121 will yield by swinging clockwise to the position shown in phantom in FIG. 13 thus allowing the arm 120 to pass. The pocket containing the partially filled bobbin thus passes the lug without the bobbin therein being doffed. It will be apparent that the feeler 87 operates automatically in the initial part of each indexing movement to select which of the bobbins transferred out of the winding position are to be doffed, the condition of the bobbin for such doffing being effected by release of the skewer latch 73 and lowering of the skewer to free the bobbin for free tilting in the pocket. Then the doffing of the selected bobbins is effected subsequently in the portion e of the indexing movement by rocking of the bell-crank while its arm 120 is in engagement with the stop 121. On the other hand, the bobbins which are reusable and not to be doffed remain held rigidly by their expanded skewers so as to cause the stop to yield out of the way during the advance of the bobbin out of the winding position.

Each bobbin which leaves the winding position and still carries enough thread to make its reuse in the winder economical, must be handled by the operator, its thread end found and then hung up in a clamp 14 the same as the thread of a new full bobbin deposited in the empty pockets passing through the loading zone f (FIG. 5). To facilitate such end finding and hanging up of the threads of partially filled bobbins, provision is made for freeing such bobbins from their skewers thus enabling the operator to withdraw the bobbins from their pockets and more easily find and extend the free ends of the threads thereof. This is accomplished easily by an auxiliary stop 133 (FIGS. 3 and 15) which becomes effective in the indexing of each bobbin beyond the doffing range e to release the latch 73 of such bobbins and thus free or unskewer the same before these bobbins are advanced into the loading zone f. In the present instance, the stop comprises the laterally bent end of an arm 134 secured to and projecting cantilever fashion from the frame lug 47ᵈ above described. The stop 133 is disposed in the path of the free end 78 of the latches moving beyond the doffing range e so as to block the latch stop and the advance thereof in the continued indexing of the magazine until the skewer tube 52 has moved out from under the latch lug 76. The skewer is released and allowed to drop thus freeing the associated bobbin. Following such release of its skewer, the bobbin is free to tilt out of vertical position and against a wall of its pocket thus giving a visual indication to the operator that such bobbin should be removed, its thread found and hung up in the clamp and placed back in a pocket being indexed through the loading zone f.

With the several simply constructed cams and stops above described, the indexing movements of the bobbin magazines are utilized to perform the numerous functions of automatically skewering the bobbins after loading into the winder magazine, unskewering of the bobbins transferred out of the winding position, selection of the bobbins containing an amount of thread insufficient to make the bobbin reusable in the winder, doffing of the empty or strip bobbins, and unskewering of the reusable bobbins. The number and complexity of the operations required to be performed by the machine operator are thus reduced to a minimum.

I claim as my invention:

1. In a winder, the combination of, a magazine rotatable about an upright axis and having angularly spaced pockets each having an apertured bottom and opening outwardly to receive and support a bobbin standing on end in the pocket with its tubular core in registry with the hole in said bottom, means for indexing said magazine step by step to present the successive bobbins to and dwell the same in a winding position during unwinding of the thread therefrom, a plurality of skewers, one for each of said pockets mounted on said magazine for endwise movement from a lower inactive position upwardly through said bottom hole to telescope within the bobbin core over a substantial length thereof, each skewer having a finger thereon movable outwardly from a normal collapsed position, means operating during advance of one of said bobbins toward said winding position in the indexing of said magazine to raise the skewer of such bobbin and telescope the same within the bobbin core, and means operable during such raising of the skewer beyond a predetermined position within said core to move said finger outwardly against the internal wall of said core.

2. In a winder adapted for automatic bobbin skewering as defined in claim 1, means operable automatically during subsequent indexing of said magazine and movement of a skewered bobbin out of said winding position to collapse the skewer thereof and lower the latter out of the bobbin core.

3. In a winder, the combination of, a magazine rotatable about an upright axis and having angularly spaced pockets each having an apertured bottom and opening outwardly to receive and support a bobbin standing on end in the pocket with its tubular core in registry with the hole in said bottom, means for indexing said magazine step by step to present the successive bobbins to and dwell the same in a winding position during unwinding of the thread therefrom, a plurality of skewers, one for each of said pockets mounted on said magazine for endwise movement from a lower retracted position upwardly through said bottom hole to telescope within the bobbin core over a substantial length thereof, each skewer having a finger thereon movable outwardly from a normal collapsed position, means operating during indexing of said magazine through a predetermined range to advance one of said bobbins toward said winding position to project the skewer thereof into the bobbin core, means operable during raising of the skewer beyond a predetermined position within in said core to move said finger outwardly against said core wall, and a latch engageable automatically with said skewer after expansion thereof to hold the skewer raised and expanded within the bobbin in the indexing of the latter beyond said range, said latch being releasable to allow the skewer to collapse and move downwardly to said retracted position.

4. In a winder adapted for automatic skewering of bobbins as defined in claim 3, means operable automatically during indexing of a skewered bobbin beyond said winding position to release said latch.

5. In a winder, the combination of, a magazine rotatable about an upright axis and having angularly spaced pockets each having an apertured bottom and opening outwardly to receive and support a bobbin standing on end in the pocket with its tubular core in registry with the hole in said bottom, means for indexing said magazine step by step to present the successive bobbins to and dwell the same in a winding position during unwinding of the thread therefrom, a plurality of skewers, one for each of said pockets mounted on said magazine for endwise movement upwardly through said bottom hole to first telescope within the core of the bobbin in the pocket and then expand therein and grip the core, a latch for each pocket pivoted on said magazine and biased toward its skewer for automatic latching thereof when the skewer has been raised to a predetermined position, means operating during indexing of each pocket toward said winding position to raise the skewer thereof until engagement of the associated latch and then free the skewer for holding by its latch, each of said latches having a projection movable circumferentially relative to said magazine in a direction opposite to the indexing motion thereof to release the latch, a stop adapted to be positioned in the path of the projection of each pocket in the indexing thereof beyond said winding position, said projection, after coming against said stop during indexing of the magazine, acting to stop the latch until, in the continued indexing of said magazine, the associated skewer has been carried out of engagement with the latch and thus released for downward movement.

6. In a winder having a bobbin skewering mechanism as defined in claim 5, means supporting said stop for movement into and out of the path of the advancing latch projections, a device for sensing the diametrical size of a bobbin being transferred away from said winding position, and means controlled by said sizing device and operable to dispose said stop in the path of said latch projection when a passing bobbin is less than a predetermined size while disposing the stop in an inactive out-of-the-way position during the passing of bobbins of larger sizes.

7. In a winder, the combination of, a magazine rotatable about an upright axis and having angularly spaced pockets each having an apertured bottom and opening outwardly to receive and support a bobbin standing on end in the pocket with its tubular core in registry with the hole in said bottom, means for indexing said magazine step by step to dwell the successive bobbins in a winding position during unwinding of the thread therefrom, a plurality of skewers, one for each of said pockets mounted on said magazine for endwise movement from a lower inactive position upwardly through said bottom hole, each skewer having a finger thereon movable outwardly from a normal collapsed position, means operating during indexing of said magazine to advance one of said bobbins toward said winding position to raise the skewer thereof and telescope the same within the bobbin core, means operable during raising of the skewer beyond a predetermined position within said core to move said finger outwardly against the internal wall of said core, means holding the skewer raised and expanded while disposed in and being indexed out of said winding position, a feeler movable into engagement with a bobbin as an incident to indexing thereof out of said winding position to determine the diametrical size thereof, and mechanism controlled by said feeler and subsequently actuated in the indexing of said magazine to retract said skewer out of its bobbin and release the latter when the bobbin, as determined by the position of said feeler, has less than a predetermined amount of thread remaining thereon.

8. In a winder, the combination of, a magazine rotatable about an upright axis and having angularly spaced pockets each having a bottom and opening outwardly to receive and support a bobbin standing on end in the pocket, means for indexing said magazine step by step to dwell the successive bobbins in a winding position during unwinding of the thread therefrom, a plurality of radially expansible skewers, one for each of said pockets mounted on said magazine for endwise movement between a lower inactive position free of the bobbin in the pocket and an upper and expanded position, means operating during the indexing of said magazine to advance one of said bobbins toward said winding position to raise the skewer thereof from said lower to said upper position, means releasably holding the skewer in said upper position when the bobbin thereon is disposed in and being indexed out of said winding position, a feeler fork opening toward said magazine axis and having circumferentially spaced legs adapted for different degrees of straddling engagement with a bobbin depending on the amount of thread remaining thereon, means supporting said fork and moving the same toward said axis and into engagement with one of said bobbins as an incident to indexing thereof out of said winding position, and mechanism controlled by the radial position of said fork and subsequently actuated in the indexing of said magazine to release said skewer to said inactive position and thereby free the associated bobbin when the feeler has moved inwardly beyond a predetermined position.

9. In a winder, the combination of, a magazine rotatable about an upright axis and having angularly spaced pockets each having a bottom and opening outwardly to receive and support a bobbin standing on end in the pocket, means for indexing said magazine step by step to dwell the successive bobbins in a winding position during unwinding of the thread therefrom, a plurality of radially expansible skewers, one for each of said pockets mounted on said magazine for endwise movement between a lower inactive position free of the bobbin in the pocket and an upper and expanded position, means operating during the indexing of said magazine to advance one of said bobbins toward said winding position to raise the skewer thereof from said lower to said upper position, means releasably holding the skewer in said upper position when the bobbin thereon is disposed in and being indexed out of said winding position, a feeler fork opening toward said magazine axis and having circumferentially spaced legs adapted for different degrees of straddling engagement with a bobbin depending on the amount of thread remaining thereon, means supporting said fork for movement toward and away from said axis into and out of engagement with one of said bobbins as an incident to indexing thereof out of said winding position, an annular series of cams, one for each of said pockets carried by and movable with said magazine and controlling the inward and outward movements of said feeler fork in timed relation to the indexing of the magazine, and mechanism controlled by the radial position of said fork and subsequently actuated in the indexing of said magazine to release said skewer to said inactive position and thereby free the associated bobbin when the feeler has moved inwardly beyond a predetermined position.

10. In a winder, the combination of, a magazine rotatable about an upright axis and having angularly spaced pockets each having a radially expansible skewer therein mounted for endwise movement in the pocket between a lower inactive position free of the bobbin in the pocket and an upper and expanded position, means operating during indexing of said magazine around said axis to raise the skewer thereof from said lower to said upper position, latches, one for each skewer, carried by said magazine and releasably holding the skewer in said upper position when the bobbin thereon is passing a predetermined position, a feeler fork opening toward said magazine axis and having circumferentially spaced legs adapted for different degrees of straddling engagement with a bobbin depending on the amount of thread remaining thereon, a member supporting said fork for movement toward said axis and into engagement with each bobbin indexed to said predetermined position, and mechanism controlled by the radial position of said fork and subsequently actuated in the indexing of said magazine to release the latch of the associated skewer and thereby free the associated bobbin when said member has moved inwardly beyond a predetermined position.

11. In a winder as defined in claim 10, a cam disk rotatable with said magazine and having groups of surfaces facing outwardly and angularly spaced to correspond to the spacing of said magazine pockets, the leading one of said surfaces being an abrupt fall followed by a rise, a follower on said member biased against the periphery of said cam disk, and mechanism controlled by the radial position of said member and operating in the indexing of the magazine after an abrupt cam surface has passed said follower to release the associated skewer latch if the member has moved inwardly beyond a predetermined position.

12. In a winder as defined in claim 10 in which the latch of each skewer is released during continued indexing of said magazine following blocking of the advance of the latch by a stop, said stop being mounted on said member and disposed in blocking position when said feeler fork is engaging a bobbin of less than a predetermined diameter, the stop being held out of the path of the latch when the fork is engaging a bobbin of larger size.

13. In a winder, the combination of, a magazine rotatable about an upright axis and having angularly spaced pockets each having a bottom and opening outwardly to receive and support a bobbin standing on end in the pocket, means for indexing said magazine step by step to dwell the successive bobbins in a winding position during unwinding of the thread therefrom, a plurality of radially expansible skewers, one for each of said pockets mounted on said magazine for endwise movement between a lower inactive position free of the bobbin in the pocket and an upper and expanded position, means operating during indexing of said magazine to advance one of said bobbins toward said winding position to raise the skewer thereof from said lower to said upper position, a latch engageable with and releasably holding the skewer in said upper position when the bobbin thereon is disposed in and being indexed out of said winding position, a feeler fork opening toward said magazine axis and having circumferentially spaced legs adapted for different degrees of straddling engagement with a bobbin depending on the amount of thread remaining thereon, a member mounted for radial movement toward and away from said magazine axis, means mounting said feeler fork on said member to swing about an upright axis extending longitudinally of said magazine axis whereby to permit said fork, after coming into straddling engagement with a bobbin, to be swung by the advancing bobbin during continued indexing thereof and finally pass out of engagement with such bobbin, means actuated in timed relation to the indexing of said magazine to move said member inwardly and carry said fork into engagement with a passing bobbin and thereafter retract the member to an out-of-the-way position, and mechanism controlled by the radial position of said member to release the skewer of the bobbin engaged by said fork when such bobbin has less than a predetermined amount of thread remaining thereon.

14. In a winder, the combination of, a magazine rotatable about an upright axis and having angularly spaced pockets each having an apertured bottom and opening outwardly for receiving and supporting a bobbin standing on end in the pocket with its tubular core in registry with the hole in said bottom, means for indexing said magazine step by step around said axis, said bobbins carrying different amounts of thread when passing a first position, a plurality of skewers, one for each of said pockets, means operable during the approach of each pocket to said first position to raise the skewer therein to and releasably hold the same in an upper position with the skewer projecting into the core of a bobbin to support the bobbin in upright position, each skewer, when released, retracting downwardly to free its bobbin for tilting outwardly, a device for measuring the amount of thread remaining on the bobbins passing said first position and automatically releasing the skewers of bobbins of less than a predetermined size, and doffing means acting during further indexing of a released bobbin with said magazine to tip the free bobbin out of its pocket and off from said magazine while leaving the remaining bobbins of larger size supported in their pockets.

15. In a winder as defined in claim 14, means operating after the doffing of the bobbins of less than a predetermined size and in the continued indexing of said magazine, to release the skewers of said remaining bobbins of larger size one by one and thus free the latter for convenient removal manually from the respective pockets.

16. In a winder, the combination of, a magazine rotatable about an upright axis and having angularly spaced pockets each having an apertured bottom and opening outwardly for receiving and supporting a bobbin standing on end in the pocket with its tubular core in registry with the hole in said bottom, means for indexing said magazine step by step around said axis, said bobbins carrying different amounts of thread when passing a first position, a plurality of skewers, one for each of said pockets, means operable during the approach of each pocket to said first postion to raise the skewer therein to and releasably hold the same in an upper position with the skewer projecting into the core of a bobbin to support the bobbin in upright position, each skewer, when released, retracting downwardly to free its bobbin for tilting outwardly, means operable during indexing of certain of said bobbins past said first position to release the skewers thereof, a bell-crank lever for each of said pockets fulcrumed intermediate its end to swing about a second axis paralleling said magazine axis and disposed adjacent the trailing edge of the pocket opening and having an inner arm following inwardly around the pocket wall to a point behind the bobbin in such pocket, said lever having a second arm projecting outward from said second axis, a stop positioned in the path of the advancing second arm and operable during indexing of the magazine to temporarily block the advance of said second arm and thereby cause said first arm to swing outward across the pocket and tip each unskewered bobbin off from the magazine.

17. In a winder as defined in claim 16 in which said stop is yieldable in the direction of indexing of said magazine when engaged by said second arm of a pocket containing a skewered bobbin whereby to yield under the resistance of the advancing skewered bobbin and allow such bobbin to pass without being doffed off from the magazine.

18. In a winder, the combination of, a bobbin pocket opening outwardly on one side and having an apertured bottom wall for supporting a bobbin standing on end therein with the tubular core of the bobbin in registry with the hole in said bottom, a member disposed below and in axial alinement with said bottom hole and mounted for endwise movement through a predetermined range between lower and upper positions, a skewer comprising a plunger projecting axially and upwardly from said member and slidably guided on said member for endwise movement with and also relative to the member, spring means acting between said member and said plunger and urging the latter upwardly relative thereto to a limit position, said skewer carrying a finger adapted for movement outwardly from a normal collapsed position into gripping engagement with the internal wall of said core, means for moving said skewer upwardly, and means for converting the final upward movement of said skewer into outward movement of said finger until the latter engages said core wall, said spring means yielding after said finger encounters said core wall whereby to permit completion of said range of movement of said member.

19. In a winder as defined in claim 18 in which said member comprises a tube having the lower end portion of said plunger disposed therein and an internal abutment engageable with a shoulder on the plunger to limit upward movement of the latter relative to the tube, said spring means being a coil within said tube compressed between said plunger and the tube.

20. In a winder as defined in claim 18 in which said skewer includes a latch movable automatically into active engagement with a downwardly facing abutment on said member when the latter reaches the upper limit of said range.

21. In a winder as defined in claim 18, a downwardly facing abutment on said member and in which said skewer includes a latch swingable toward and away from the skewer axis for engagement beneath said abutment, and means biasing said latch against said member when the latter is below the upper limit of said range and in beneath said abutment when said member reaches such upper limit.

22. In a winder, the combination of, a bobbin pocket opening outwardly on one side and having an apertured bottom wall for supporting a bobbin standing on end therein with the tubular core of the bobbin in registry with the hole in said bottom, a skewer mounted for endwise vertical movement through said hole into and out of said bobbin core and through a predetermined range upwardly away from and downwardly to a normal retracted position out of gripping engagement with the core, said skewer carrying a finger adapted for movement from a normal collapsed position radially and outwardly into gripping engagement with the internal wall of said core, means for moving said skewer upwardly, and means for converting the final upward movement of said skewer into outward movement of said finger until the latter engages said core wall, said last mentioned means including a part adapted to yield after said finger encounters said core whereby to permit completion of said range of skewer movement.

23. In a winder, the combination of, a pocket opening outwardly along one side and having a bottom defined by a conical wall converging downwardly toward a hole therein whereby the tubular core of a bobbin dropped endwise into the pocket will come into registry with said hole, a skewer mounted for endwise vertical movement through said hole into and out of said core, means for moving said skewer upwardly through a predetermined range away from a retracted position, said skewer carrying a finger movable outwardly from a collapsed position into gripping engagement with the internal wall of said bobbin core and cooperating with said conical wall to hold the same firmly in upright position, and means for converting the final upward movement of said skewer into outward movement of said finger.

24. In a winder as defined in claim 23, a guide extending generally horizontally across the open side of said pocket intermediate the ends thereof and acting to limit outward tilting of a bobbin in said pocket to a position for receiving said skewer when the latter is projected upwardly.

25. In a winder, the combination of, a bobbin pocket opening outwardly on one side and having an apertured bottom wall with a hole therein, said wall being adapted to support a bobbin standing on end in the pocket with the tubular core of the bobbin in registry with said hole, a skewer comprising a plunger projecting axially and upwardly through said hole and mounted for endwise upward movement from a lower retracted position whereby to telescope within said bobbin core, an L-shaped bell-crank having a long leg extending along one side of said plunger and a short leg projecting laterally from the plunger at the lower end of said leg, means fulcruming the heel of said bell-crank on said plunger for swinging thereof in a radial plane, a stop disposed above and in the path of the outer end of said short arm after entry of the plunger and said long arm a substantial distance into said bobbin core, and means for raising said plunger beyond the point of abutment of said short arm with said stop whereby to rock the bell-crank and move the upper end of said long arm outwardly against the internal wall of said bobbin core.

26. In a winder as defined in claim 25 in which that portion of the apertured bottom wall which defines said hole constitutes a cam acting on said long bell-crank arm to swing the latter inwardly to collapsed position during lowering of said plunger from its upper position.

27. In a winder, the combination of, a bobbin pocket opening outwardly on one side and having an apertured bottom wall with a hole therein for supporting a bobbin standing on end therein with the tubular core of the bobbin in registry with a hole in said bottom, a skewer comprising a plunger projecting axially and upwardly through said hole and mounted for endwise upward movement from a lower retracted position whereby to telescope within said bobbin core, an elongated finger extending along one side of said plunger in a normally collapsed position, means fulcruming the lower end of said finger on said plunger below said bobbin core for swinging of the finger in a radial plane outwardly against the internal wall of said core, means for raising said plunger and said finger upwardly from said retracted position to telescope substantial lengths thereof within said core, and means operable in the continued upward movement of said plunger to swing said finger outwardly and bring the upper end thereof against the internal wall of said bobbin core.

References Cited by the Examiner

UNITED STATES PATENTS

| | | | |
|---|---|---|---|
| 1,115,509 | 11/14 | Colman et al. | 242—130 |
| 1,678,806 | 7/28 | Colman | 242—130 |
| 2,632,612 | 3/53 | Stange | 242—130 |
| 2,954,183 | 9/60 | Townsend | 242—129.7 |
| 3,017,129 | 1/62 | Trost | 242—35.6 |
| 3,048,349 | 8/62 | Pitts et al. | 242—130 |

FOREIGN PATENTS

| | | |
|---|---|---|
| 1,222,349 | 1/60 | France. |

MERVIN STEIN, *Primary Examiner.*